United States Patent
Uozumi et al.

[11] 3,733,932
[45] May 22, 1973

[54] HYDRAULIC CONTROL SYSTEM FOR AUTOMATIC TRANSMISSIONS

[75] Inventors: Sumio Uozumi; Ichio Sakai, both of Toyota, Japan

[73] Assignee: Toyota Jidosha Kogyo Kabushiki Kaisha, Aichi-ken, Japan

[22] Filed: May 5, 1971

[21] Appl. No.: 140,327

[30] Foreign Application Priority Data

May 9, 1970 Japan..................................45/39414

[52] U.S. Cl......................................74/869, 74/360
[51] Int. Cl..........................B60k 21/00, F16h 3/08
[58] Field of Search........................74/869, 863–865, 74/867, 868

[56] References Cited

UNITED STATES PATENTS

| | | | |
|---|---|---|---|
| 2,785,583 | 3/1957 | Kelbel | 74/863 |
| 2,896,468 | 7/1959 | Check et al. | 74/869 |
| 3,308,676 | 3/1967 | Zundel et al. | 74/864 |
| 3,400,613 | 9/1968 | Johnson et al. | 74/869 |

*Primary Examiner*—Arthur T. McKeon
*Attorney*—Toren and McGeady

[57] ABSTRACT

A hydraulic control system for automatic transmissions comprising hydraulic servo means operable to actuate clutch means of the transmission assembly, a pressure oil source for generating pressure oil to be supplied to said hydraulic servo means, a pressure control valve adapted to control pressure oil from said pressure oil source to obtain a required line pressure, a throttle valve for generating a throttle pressure corresponding to the opening of the engine throttle valve, a governor valve generating a governor pressure corresponding to the vehicle speed, a manual valve for distributing the line pressure to a required hydraulic servo circuit to achieve a required transmission condition, a 1 – 2 shift valve for shifting between the first speed and second speed conditions of the transmissions according to the vehicle running conditions regulated by the throttle pressure and governor pressure, a 2 – 3 shift valve for shifting between the second speed and third speed conditions of the transmission according to the vehicle running conditions, accumulator means for moderating the application of the line pressure to a servo oil chamber of the clutch means for the third speed, a 2 – 3 timing valve for determining the timing of up or down shift in the second and third speed conditions of the transmission, and an orifice control valve adapted to control the flow rate of the line pressure supplied to the servo oil chamber in the clutch means for the second speed so as to lessen the shift shock. The throttle valve is so arranged that when the opening of the engine throttle valve is less than 1/4 of the full opening, it functions to drain pressure oil from the pressure oil source by a pilot valve in cooperation with a throttle lever thereby to change the controlling action of the pressure control valve so as to obtain an extremely low constant line pressure from said pressure control valve, this valve being also so arranged that when the transmission is in the third speed condition, the controlling action of said valve is further changed by the line pressure supplied to the servo oil chamber in the clutch means for the third speed so as to obtain a still lower line pressure.

8 Claims, 6 Drawing Figures

INVENTORS
SUMIO UOZUMI
BY ICHIO SAKAI

Toren and McGeady
ATTORNEYS 3,733,932

HYDRAULIC CONTROL SYSTEM FOR AUTOMATIC TRANSMISSIONS

BACKGROUND OF THE INVENTION

The present invention relates to a device for suitably controlling the working oil pressure (hereinafter referred to as line pressure PL) applied to the hydraulic servo means for operating clutch means of the automatic transmissions.

It is highly desirable that the oil pressure or line pressure PL acting upon hydraulic servo means of automatic transmissions be varied according to the running conditions of vehicles. High line pressure results in increased power loss by the pump (particularly at the time of high-speed running) and also tends to produce abnormal sounds. Additionally, the shock produced upon changes of gear ratio is also enlarged. Therefore, a device is usually incorporated in the system to minimize the line pressure when higher pressure levels are not necessitated.

For the above-stated reasons, such line pressure, in the conventional systems, is increased during the low-speed running and lowered during the high-speed running. Additionally, change of line pressure is also effected in accordance with vehicle speed. However, conventional line pressure controlling mechanisms usually involve an attendant disadvantage in that they tend to give rise to shock when the manual valve range is varied by operation of the shift lever. This occurs due to the fact that in conventional systems, a relatively high line pressure PL is present at the time of stoppage of the vehicle even if the engine throttle valve is in a fully-closed position, so that when gear shifting is effected from, for example, the neutral range (N position) to the drive range (D position), the transmissions will establish the gearing engagement rather suddenly, and this gives rise to an accompanying shock. Such shock resulting from such positional change of the shift lever is also caused in other types of gear change, e.g from N position to reverse range (R position) or from parking range (P position) to R position.

When shift lever changing occurs as described above, gearing engagement for forward running speed at the D range or for reverse running speed at the R range is established. However, if such engagement is set up under a high line pressure with no sliding in such engagement, there may be cause a so-called "creep" phenomenon —whereby the vehicle begins to run spontaneously even when the engine throttle valve is in a fully-closed position, without the accelerator being depressed. This creep phenomenon is a significant nuisance to the driver because it requires that he continue stepping on the brake pedal whenever the vehicle is momentarily stopped such as for example, at a crossing otherwise, the vehicle may start running by itself even if the accelerator is not applied.

It is a primary object of the present invention to obtain an extremely low constant line pressure PL when the opening of the engine throttle valve is relatively small, for example less than one-fourth of the full opening, so as to lessen the shock experienced at the time of positional change of the shift lever and to prevent the above-aforementioned creep phenomenon.

It is another object of the present invention to provide a mechanism in which the line pressure PL supplied to the hydraulic servo means is controlled so that when the plug displacement of the throttle valve which produces oil pressure corresponding to the engine throttle valve opening (such oil pressure being called throttle pressure $P_{th}$) reaches a certain predetermined value, the controlling action of said pressure control valve is varied so as to obtain an extremely low constant line pressure during the small throttle valve opening period to thereby accomplish the above-stated first object of the invention, and to obtain a higher constant line pressure PL when the throttle valve opening is relatively large, thereby to produce a line pressure PL conforming to the engine output.

It is still another object of the present invention to obtain a lower line pressure PL during running at the maximum gear ratio at which the vehicle is run most of the time, and to obtain a higher line pressure PL during running at lower gear ratios where larger torque transmission is usually required, thereby to minimize horse power loss by the pump and prevent abnormal sounds.

It is yet another object of the present invention to provide an arrangement in which pressure oil (line pressure PL) supplied to the hydraulic servo means for achieving the maximum gear ratio is transmitted to the pressure control valve which controls said line pressure PL, thereby to obtain a lower line pressure during running at the maximum gear ratio.

It is also an important object of the present invention to provide practical features especially suited for the automatic fluid transmissions for vehicles whereby there is obtained suitable change of line pressure in a three forward speed and one reverse speed transmission. In accordance with such practical features the line pressure PL is set at a high constant level in the first, second and reverse speeds, while such line pressure is set at a lower level when the opening of the engine throttle of the engine throttle valve is relative small.

Other objects of the present invention will become apparent from the following description of a preferred embodiment of the invention.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIGS. 5 and 6 are characteristic diagrams of the line pressure PL obtained from the said hydraulic operating circuit of the present invention, where

DESCRIPTION OF A PREFERRED EMBODIMENT

Figure 1:
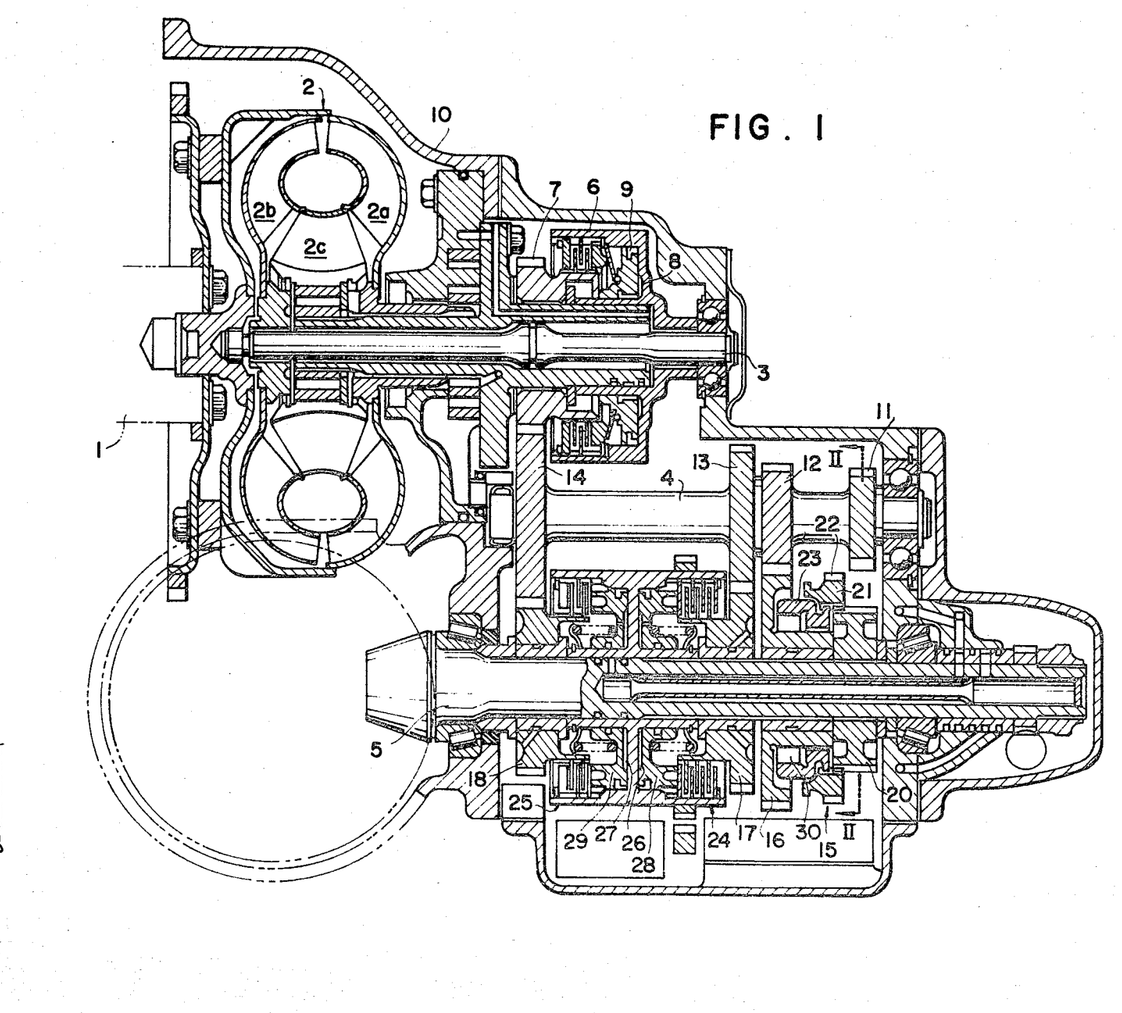
FIG. 1 is a longitudinal sectional view of an embodiment of the automatic transmissions with which the hydraulic controlling device according to the present invention may be utilized.
Figure 2:
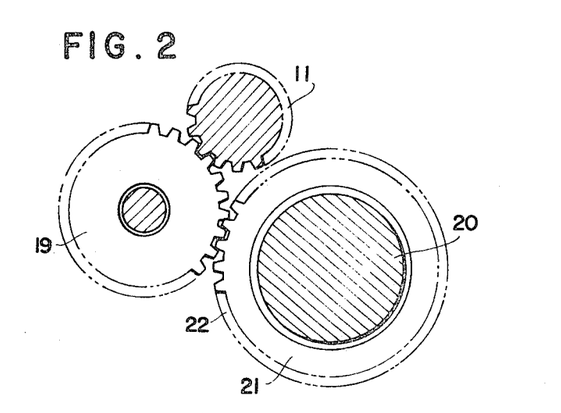
FIG. 2 is a sectional view taken along the line II—II of FIG. 1.

Referring first to FIGS. 1 and 2 of the drawings, there is shown a parallel geared type transmission of three forward running speeds and one reverse running speed used in a front engine - front drive (F—F) system or a rear engine - rear drive (R—R) system.

In the construction of this transmission mechanism numeral 1 designates an output shaft extending from the engine (not shown), 2 is a torque convertor, 3 is an input shaft, 4 is an intermediate shaft, and 5 is an output shaft. The output shaft 1 from the engine and the input shaft 3 are mounted coaxially through the torque convertor 2, and the input shaft 3, intermediate shaft 4 and output shaft 5 are disposed in parallel relation to each other. All of these shafts 1, 3, 4 and 5 are supported in position by a gear case 10.

The torque convertor 2 consists of a pump 2a, a turbine 2b and a stator 2c. The output shaft 1 from the engine is rotatably connected to the pump 2a of said torque convertor, while the input shaft 3 is rotatably connected to the turbine 2b of the torque convertor, so that the turning force of said output shaft 1 is suitably acted upon by said torque convertor and then transmitted to the input shaft 3. The input shaft 3 has carried thereon through a multiple disc friction clutch 6 a transmission gear 7 which is rotatably connected to said input shaft. When servo oil pressure is supplied to an oil chamber 8, a piston 9 is actuated to press said multiple disc clutch 6 into an engaged (ON) condition. On the other hand, when said servo oil pressure is removed from the oil chamber 8, pressure against the multiple disc clutch is released to render it into a released (OFF) condition.

On the intermediate shaft 4 there are mounted four speed change gears 11, 12, 13 and 14. These speed change gears 11, 12, 13 and 14 are connected coaxially with the intermediate shaft 4 and arranged in consecutive order from right to left are adapted such that the gear 11 serves for reverse running, the gear 12 for the first speed, the gear 13 for the second speed and the gear 14 for the third speed, respectively. Of this group of speed change gears mounted on the intermediate shaft 4, the gear 14 for the third speed is in a meshed relation with the transmission gear 7 on the input shaft 3. Therefore, when the multiple disc friction clutch 6 is in an engaged condition, the input shaft's torque is transmitted through said gears 7 and 14 to the intermediate shaft 4 to keep rotating the speed change gears 11, 12, 13 and 14.

On the output shaft 5 are mounted the speed change gears 16, 17 and 18 for the first, second and third speeds, respectively, the mounting being such that said gears are rotatable relative to said shaft 5. These speed change gears 16, 17 and 18 on the output shaft 5 are meshed with the speed change gears 12, 13 and 14, respectively, on the intermediate shaft 4. More significantly, the gears 12 and 16, 13 and 17, and 14 and 18 are meshed with each other to constitute the gear combinations for the first, second and third speeds, respectively. The speed change gear 11 for reverse running on the intermediate shaft 4 is meshed with an idle gear 19 rotatably supported in the case 10 as shown in FIG. 2.

There is also provided a selective gearing assembly 15 for the first speed and for the reverse speed. This assembly is arranged with a splined hub 20 connected with the output shaft 5 and provided in alignment with the reverse running speed change gear 11 on the intermediate shaft 4 and the idle gear 19, and with a hub sleeve 21 fitted on said hub 20 in such manner that the former can slide axially (in the right and left direction in the figure). At the periphery of said hub sleeve 21 is provided an external gear 22 adapted to mesh with the idle gear 19. On the left side of hub 20 is provided a spline member 23 having formed in its outer peripheral face a spline groove. This spline member 23 is connected with the speed change gear 16 for the first speed through a one-way clutch 30 and has an outer diameter equal to that of the hub 20 so that said hub sleeve 21, when moved to the left, is engaged with the spline of said spline member 23. It will be understood that when the hub sleeve 21 is located on the hub 20 at the extreme right position, the external gear 22 of said sleeve 21 is meshed with the idle gear 19, but when said sleeve moves to the left, the meshed relation between said external gear 22 and idle gear 19 is broken and the spline member 23 on the speed change gear 16 for the first speed is engaged with the hub 20 through the hub sleeve 21.

Between the speed change gears 17 and 18 for the second and third speeds, respectively, on the output shaft 5 are provided two multiple disc friction clutch assemblies 24, 25 to rotatably couple said gears 17, 18 to the output shaft 5. One of said clutch assemblies 24 connects the speed change gear 17 for the second speed to the output shaft 5 and the other clutch assembly 25 connects the speed change gear 18 for the third speed to said shaft 5. These clutch assemblies are arranged such that when servo oil pressure is supplied into their oil chambers 26, 27, the respective pistons 28, 29 are actuated to press the respective clutch discs to establish an engaged (ON) condition and when said servo oil pressure is removed from said oil chambers 26, 27, pressure is released to render the clutches into a released (OFF) condition. Thus, when servo oil pressure is fed into the oil chamber 26, the clutch assembly 24 is forced into an engaged condition, causing the gear 17 for the second speed to be engaged with the output shaft 5, while when servo oil pressure is supplied to the oil chamber 27, the clutch assembly 25 is turned into an engaged condition to cause the gear 18 for the third speed to be engaged with the output shaft 5.

In the transmission mechanism described above, the change gear ratios for the three forward running speeds and one reverse running speed are obtained by suitably selectively operating the clutch means 6, 24, 25 and selective gearing means. Now, the operation for achieving each speed range will be described.

First Speed

The hub sleeve 21 is slid to the left to couple the spline member 23 and the hub 20 and the clutch 6 is actuated, whereupon rotation of the input shaft 3 is transmitted through the clutch 6 - transmission gear 7 - speed change gear 14 - intermediate shaft 4 - speed change gear 12 (in that order) to the speed change gear 16 on the output shaft with reduced speed. Since the spline member 23 and the hub 20 are coupled to each other through the hub sleeve 21 as stated above, rotation of the speed change gear 16 is transmitted through the one-way clutch 30 to the output shaft 5 to thereby achieve the condition of the first speed.

Second Speed

With the hub sleeve 21 kept in the left slide position, the clutch means 6 and the clutch means 24 for the second speed are actuated. Thereupon, rotation transmitted to the speed change gear 13 for the second speed on the intermeidiate shaft in the same manner as in the case of the first speed is transmitted through the speed change gear 17 and the clutch means 24 to the output shaft 5 with somewhat reduced speed.

Third Speed

Keeping the hub sleeve 21 in its leftwise slide position, the clutch means 6 and the clutch means 25 for the third speed are actuated, whereupon rotation of the input shaft 3 is transmitted through the speed change gear 14 for the third speed on the intermediate shaft 4 to the speed change gear 18 on the output shaft 5 and then further transmitted through the clutch 25 to the output shaft, thereby achieving the condition of the third speed.

Reverse Running Speed

After sliding the hub sleeve 21 to its right position, the clutch means 6 is actuated, whereupon said hub sleeve 21 has its external gear 22 meshed with the idle gear 19, thereby establishing a power transmission system including speed change gear 11 for reverse running on the intermediate shaft 4 - idle gear 19 - hub sleeve 21 - hub 20 - output shaft. Unlike in the case of the forward running speeds, this power transmission system includes the idle gear 19, so that rotation of the output shaft is reversed to achieve the reverse running speed.

Figure 3:
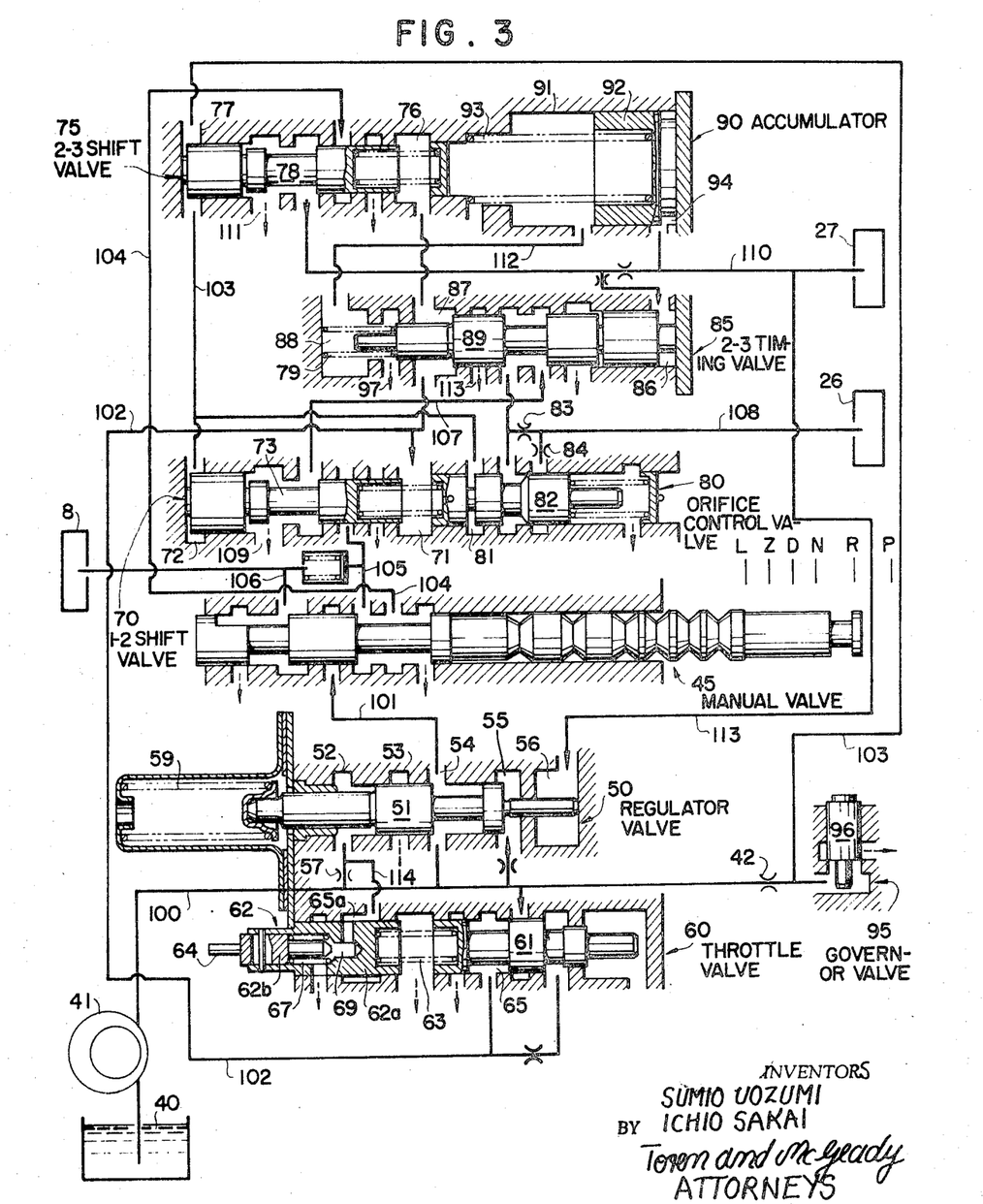
FIG. 3 is a sectional schematic diagram of the hydraulic operating circuit according to the present invention.

In the above-described transmission mechanism, change-over of speed is achieved by supplying or releasing line pressure PL to or from the oil chambers 8, 26 and 27 in the multiple disc friction clutch assemblies 6, 24 and 25, respectively, and this operation is conducted by a hydraulic operating circuit shown in FIG. 3. This hydraulic operating circuit comprises essentially the following elements:

Oil reservoir 40
Oil pump 41
Pressure control valve 50
Throttle valve 60
Manual valve 45
1-2 shift valve 70
2-3 shift valve 75
Orifice control valve 80
2-3 timing valve 85
Accumulator 90
Governor valve 95

In the following there is given a detailed description for each of the above elements.

The oil pump 41 is directly driven by the engine to pump up oil from the oil reservoir 40 so as to generate in the circuit 100 an oil pressure, or linepressure PL, to be supplied to the hydraulic servo chambers in the multiple disc friction clutch assemblies 6, 24 and 25. The oil pressure in the circuit 100 is guided to the pressure control valve 50 whereby it is controlled to a desired line pressure and then further delivered through the circuit 101 to the manual valve 45. This control of line pressure PL by the pressure control valve 50 is a featured point of the present invention and will be discussed in further detail later.

The throttle valve 60, which receives oil pressure in the circuit 100 as input, senses the opening of the engine throttle valve as plug displacement and controls said oil pressure proportionally to said displacement or the extent of opening so as to produce such controlled oil pressure in the circuit 102. This controlled oil pressure is called throttle pressure $P_{th}$. It will be obvious that this throttle pressure $P_{th}$ is increased in proportion to the increase of the opening of the engine throttle valve.

The governor valve 95 is driven by the transmission output shaft 5 to generate in its valve 96 a centrifugal force corresponding to the rotational velocity of said output shaft so as to produce an oil pressure corresponding to said centrifugal force. Pressure oil is supplied from the circuit 100 through an orifice 42 to the governor valve 95 whereby said supplied pressure oil is controlled to a pressure corresponding to the rotational velocity of the transmission output shaft (proportional to vehicle speed), so as to generate such controlled oil pressure in the circuit 103. This oil pressure controlled by said governor valve 95 and generated in the circuit 103 is called governor pressure $P_{go}$. As will be apparent from the above-said controlling formula, this governor pressure $P_{go}$ is increased in proportion to the increase of the rotational velocity of the transmission output shaft.

The manual valve 45 is, in other words, a distributor valve for distributing the line pressure PL in the circuit 101, to a required hydraulic servo circuit so as to achieve a desired change gear ratio. This manual valve 45 is linked to a shift lever provided in the driver's cab of the vehicle, not shown, so that the driver can control said valve by operating the shift lever. The manual valve in the embodiment shown has six positions: parking range (P position), reverse range (R position), neutral range (N position), drive range (D position), second range (2 position) and low range (L position). The P position or parking range is used when the vehicle is parked. In this position, a claw (not shown) coupled to the manual valve is engaged with teeth of a gear connected with the output shaft to thereby lock said shaft to inhibit movement of the vehicle. The R position is used for moving the vehicle backwards, in which case the line pressure PL in the circuit 101 is distributed to the circuit 106. The N position or neutral range is used for obtaining a neutral condition where gears are in a disengaged position. In this position, line pressure PL in the circuit 101 is not distributed to any other circuit. This condition is shown in FIG. 3.

The D position or drive range is used for obtaining automatic speed change of first speed ⇄ second speed ⇄ third speed. In this position, line pressure PL in the circuit 101 is distributed to the circuits 104 and 105. The two-position or second range is used for obtaining automatic speed change of first speed ⇄ second speed, where line pressure in the circuit 101 is distributed to the circuits 105 and 106. It will be noted that the third speed condition is not obtained in this second range. The L position is used for obtaining only the first speed of forward running, and in this position the line pressure PL in the circuit 101 is distributed only to the circuit 106. The second and third speeds are not obtained in this position.

The 1–2 valve 70 is a valve for switching the speed range from the first speed to the second speed according to the running conditions of the vehicle when the manual valve 45 is in the D or 2 position. This 1–2 shift valve 70 is so designed that it is operated in conformity to the vehicle speed and the opening of the engine throttle valve which are parameters of the running conditions of the vehicle. A throttle pressure $P_{th}$ corresponding to the opening of the engine throttle valve is acting from the circuit 102 to the oil chamber 71 on the right side of said 1–2 shift valve 70, while a governor pressure $P_{go}$ corresponding to the vehicle speed is acting from the circuit 103 to the oil chamber 72 on the left side of said valve 70. Therefore, the valve 73 of the 1–2 shift valve 70 is operated in accordance with the correlation between the governor pressure $P_{go}$ and the throttle pressure $P_{th}$. That is, in case the acting force of the throttle pressure $P_{th}$ to the valve 73 is larger than that of the governor pressure $P_{go}$, said valve remains in its left position in the figure and, hence, the circuit 107 to the servo oil chamber 26 of the clutch means 24 for the second speed is communicated with the drain port 109, so that said clutch means 24 remains inoperative, and therefore the transmission is in the first speed condition. But, when the vehicle speed is increased to make the acting force of the governor pressure $P_{go}$ greater than that of the throttle pressure $P_{th}$, the valve body 73 is moved to its right position, causing the circuit 105 from the manual valve 45 to communicate with the circuit 107 to the clutch means 24 for the second speed, thus allowing the line pressure PL in the circuit 105 to pass through the 1–2 shift valve 70 and circuits 107, 108 into the servo oil chamber 26 in the clutch means 24 whereby the transmission is automatically changed from the first speed to the second speed condition.

The 2–3 shift valve 75 is a valve for switching the speed range from the speed to third speed according to the running conditions of the vehicle when the manual valve 45 is in the D position. This 2–3 shift valve 75 is designed to be operated by the same principle as the above-said 1–2 shift valve 70. That is, a throttle pressure $P_{th}$ is acting in the oil chamber 76 on the right side of the 2–3 shift valve 75, while a governor pressure $P_{go}$ is acting in the oil chamber 77 on the left side. Thus, in case the acting force of the throttle pressure $P_{th}$ to the valve 78 is greater than that of the governor pressure $P_{go}$, said valve stays at its left position in the figure and, hence, the circuit 110 to the servo oil chamber 27 of the clutch means 25 for the third speed is communicated with the drain port 111, so that said clutch means 25 for the third speed remains inoperative, and therefore the transmission remains in either the first speed condition or the second speed condition by the actuation of the aforementioned 1–2 shift valve 70. But, when the vehicle speed is increased to make the acting force of the governor pressure $P_{go}$ greater than that of the throttle pressure Pth, the valve 78 is moved to its right position to let the circuit 104 from the manual valve 45 communicate with the circuit 110 to the clutch means 25 for the third speed, whereby the line pressure PL in the circuit 104 is allowed to pass through the 2–3 shift valve 75 and circuit 110 into the servo oil chamber 27 in said clutch means 25 to thereby actuate the latter. When the line pressure PL is supplied to the servo oil chamber 27 in said clutch means 25, the line pressure in the circuit 108, which has theretofore been applied to the servo oil chamber 26 in clutch means 24 for the second speed, is excluded by the 2–3 timing valve 85 to be described later, so that the transmission is automatically switched from the second speed to the third speed condition. It is to be noted that this 2–3 shift valve 75 is so constructed that its valve 78 will have a sufficient oil-receiving area to ensure switching to the third speed after actuation of the 1–2 shift valve 70, that is, after the transmission has been switched to the second speed.

The accumulator means 90 is provided in the circuit 110 leading to the clutch means 25 for the third speed and is designed to allow gentle application of line pressure PL to the servo oil chamber 27 of said clutch means 25. In the accumulator means 90 is provided a piston 92 which is slidable in a cylinder 91 and is pressed to the right by a coil spring 93. When the transmission is turned into the third speed condition by the actuation of the 2–3 shift valve 75 and line pressure PL is supplied to the circuit 110, such pressure also acts to a chamber 94 on the right side of the accumulator means 90. And when said line pressure PL in the circuit 110 is increased until it becomes balanced with the acting force of the coil spring 93, the piston 92 is moved to the left by pressure oil in the chamber 94. During this movement of the piston 92, oil pressure in the circuit 110 remains balanced with the acting force of the coil spring 93, thus allowing gentle engaging action of the clutch assembly 25 for the third speed.

The 2–3 timing valve 85 is a valve for achieving changeover timing of either up-shift from the second to third speed condition of the transmission or down-shift from the third to second speed condition. For actuating said 2–3 timing valve 85, oil pressure in the circuit 110 to the clutch assembly 25 is applied to the oil chamber 86 on the right side, while throttle pressure $P_{th}$ in the circuit 102 acts in the oil chamber 87 on the left side. Also oil pressure in the circuit 112 connected to the circuit 110 leading to said clutch assembly 25 is applied to another oil chamber 88 on the left side through the accumulator 90. When the transmission is in the second speed condition, no line pressure PL is supplied to the circuit 110 and, hence, no oil pressure is applied to either chambers 86 and 88, so that the valve body 89 stays in its right position (as seen in the figure) owing to the acting force of throttle pressure $P_{th}$ in the oil chamber 87 and the spring load by the coil spring 79, keeping the circuits 107 and 108 in communicated relation. Therefore, when line pressure PL is supplied to the circuit 107 from the 1–2 shift valve 70, said line pressure PL is also supplied to the circuit 108 to cause engagement of the clutch assembly 24 for the second speed to obtain the second speed condition. Then, when it is switched to the third speed by operation of the 2–3 shift valve 75 and line pressure PL is supplied to the circuit 110, this oil pressure supplied to the circuit 110 is supplied to the oil chamber 86 and acts against the rightward acting force of said coil spring 79 and throttle pressure Pth. When the leftward acting force of oil pressure in the oil chamber 86 overcomes the above-said rightward acting force, the valve body 89 is moved to its left position to break the communication between the circuits 107 and 108 and, instead, communicate the circuit 108 with the drain port 113 to exclude oil pressure in the servo oil chamber 26 in the clutch assembly 24 for the second speed to thereby release said clutch assembly 24.

In this manner, the 2-3 timing valve 85 functions to disengage the clutch 24 for the second speed when the clutch 25 for the third speed is engaged. This timing is varied depending on the strength of throttle pressure $P_{th}$. That is, when throttle pressure $P_{th}$ is small, the rightward acting force to the valve 89 is also small and, hence, the valve body 89 can be moved by a relatively low oil pressure in the oil chamber 86, so that the time in which the engaged condition of the clutch means 24 for the second speed is overlapped with that of the clutch means 25 for the third speed is short. But, when throttle pressure Pth is raised, oil pressure in the oil chamber 86 to move the valve 89 leftward must also be increased so that the overlap time of both clutch means 24 and 25 is elongated in proportion to the throttle pressure Pth.

The orifice control valve 80 is provided in the circuit 108 leading to the clutch means 24 for the second speed and is adapted to control the flow rate of line pressure PL supplied to the servo oil chamber 26 in the clutch assembly for the second speed during the second speed gear change operation to thereby lessen the shock resulting from such shifting operation. The valve 82 of said orifice control valve 80 is operated by governor pressure $P_{go}$ supplied from the circuit 103 to the oil chamber oil chamber 81 on the left side so as to perform its orifice action of closing — opening — closing according to increase of the governor pressure $P_{go}$. Thus, when the governor pressure $P_{go}$ is smallest or highest, that is, when the vehicle speed is extremely low or high, said orifice control valve 80 remains closed so that oil pressure supply to the servo oil chamber 26 in the clutch assembly 24 is effected only through an orifice 83 provided in the circuit 108, resulting in low-rate supply of oil pressure. On the other hand, when the vehicle speed is at a normal level and hence the governor pressure is of moderate strength, the orifice control valve 80 remains open to allow supply of oil pressure through said orifice 83, said orifice control valve 80 and orifice 84 to the servo oil chamber 26 in the clutch assembly 24, so that such supply of oil pressure is conducted at a faster rate than in the case of low or high vehicle speed.

In the foregoing there has been outlined each of the essential constituents of the hydraulic operating circuitry used in the present invention, but the key elements which characterize the present invention are the pressure control valve 50 and throttle valve 60 adapted to control the strength of the line pressure PL in said circuitry. So, the following discussion will be devoted to these elements with particular reference to FIG. 4 which shows, in a somewhat enlarged scale, these elements and their associated mechanisms as picked up from FIG. 3.

Figure 4:
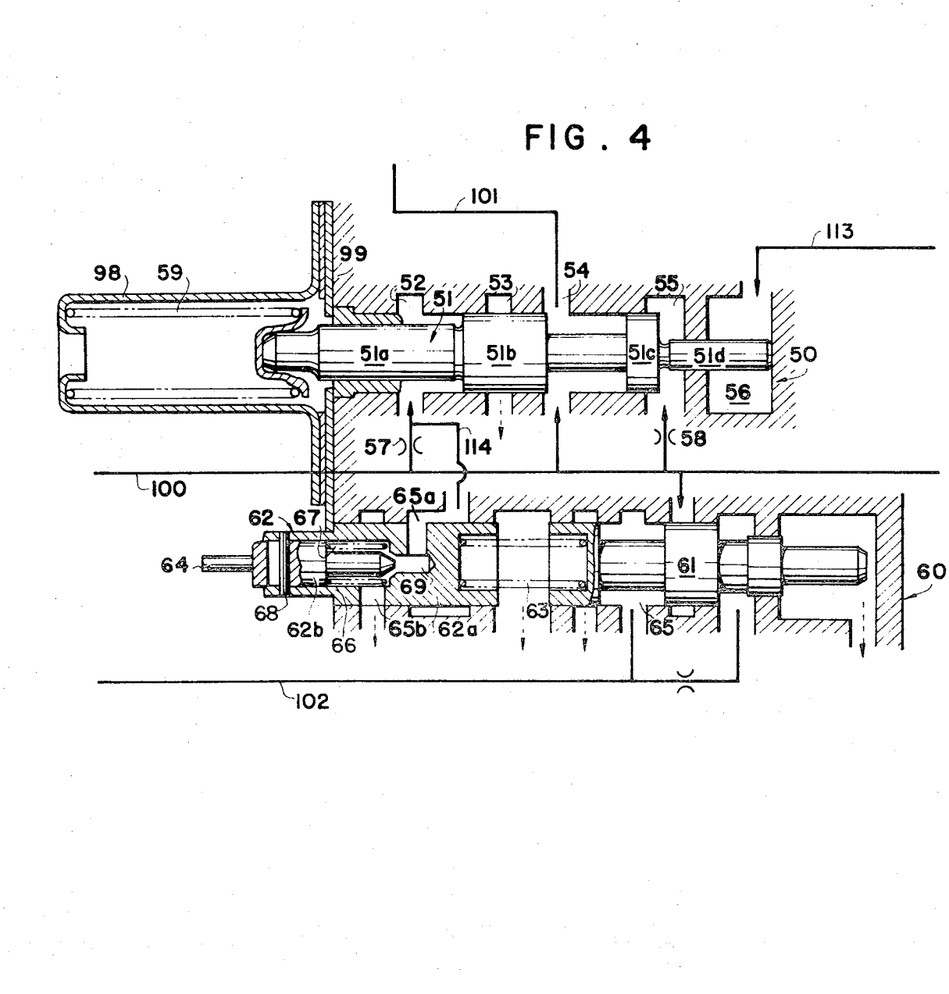
FIG. 4 is an enlarged sectional schematic view of the essential constituents of the present invention particularly depicting the pressure control valve and the throttle valve of the hydraulic operating circuit of FIG. 3.

The pressure control valve body or plug 50 has formed in its valve 51 four lands 51a, 51b, 51c and 51d and five oil chambers 52, 53, 54, 55 and 56 arranged in that order from left to right in the figure. The oil chamber 52 is connected through an orifice 57 to a circuit 100 where pressure oil pumped up by an oil pump 41 is present. Said oil chamber 52 is also connected to an oil chamber 65a in the throttle valve 60 to be described later. The oil chamber 53 serves as a pressure-excluding circuit. The oil chamber 54 is connected to the circuit 100 as well as to a connecting circuit 101 whereby it is connected to the manual valve 45. When the valve 51 moves to its left position, said oil chamber 54 is brought into communicated relation with the oil chamber 53 to control flow rate of pressure oil from the circuit 100 to the oil chamber 53, so as to suitably adjust oil pressure from the circuit 100 and guide it to the circuit 101. Oil chamber 55 is connected to the circuit 100 through an orifice 58, while oil chamber 56 is connected through a circuit 113 to the circuit 110 which leads to the clutch assembly 25 for the third speed. It will be seen, therefore, that when the transmission is in the third speed condition, said oil chamber 56 is supplied with pressure oil from the circuit 110 through the circuit 113, but when the transmission is in the first or second speed condition, no pressure oil is supplied to the oil chamber 56 since, in this case, no pressure oil is present in said circuit 110.

At the left end of the valve 51, there is disposed a coil spring 59 between said valve and a check element 98 projecting from the valve body 99, and the spring load of said coil spring 59 exerts a rightward acting force to said valve body 51. The forces acting to the valve 51 of the pressure control valve body 50 are as follows. Acting rightwards are the spring load of the coil spring 59 and oil pressure present in the oil chamber 52, and acting leftwards are oil pressures present in the oil chambers 55 and 56, respectively. Control of oil pressure in the oil chamber 55, and hence oil chamber 54, is achieved by balancing of these rightward and leftward acting forces. But, since the spring load of the coil spring 59 is always constant, the controlling action is actually performed depending on presence or absence of pressure oil in both oil chambers 52 and 56. Namely, when pressure oil is present in the oil chamber 52, the rightward acting force is raised, so that it is necessitated to correspondingly increase the leftward acting force, and this necessarily requires increase of oil pressure in the oil chamber 55, and thus oil flow rate control is conducted between the oil chambers 54 and 53 to achieve a desired high pressure level. On the other hand, in case no pressure oil is present in the oil chamber 52, the only force that provides the rightward acting force is spring load of the coil spring 59, so that oil pressure is controlled to a low value corresponding to said spring load.

Since the acting direction of pressure oil in the oil chamber 56 is opposite to that of pressure oil in the oil chamber 52, presence or absence of pressure oil in said oil chamber 56 produces a contrariwise action. That is, in case pressure oil is present in the oil chamber 56, the leftward acting force may be provided partly by the acting force of oil chamber 56 and partly by the acting force of oil chamber 55, so that oil pressure to be controlled by oil chamber 55, and hence by oil chamber 54, may be of a low level. On the other hand, in case no pressure oil exists in the oil chamber 56, the leftward acting force is provided by oil pressure in oil chamber 55 alone, so that high oil pressure is required in said oil chamber 55, and hence oil pressure to be controlled by oil chamber 54 is also high.

Now, the discussion is directed to the throttle valve 60. The throttle valve 60 consists of a valve body 61 and a plug 62, with a coil spring 63 being interposed between them. The plug 62 is pushed in the right direction in accordance with the opening of the engine throttle valve by operation of a throttle lever 64 which is linked to the accelerator and hence to the engine throttle valve. Displacement by rightward movement of said plug 62 is transmitted through the coil spring 63 to the valve 61 so as to produce in oil chamber 65 an oil pressure, or throttle pressure Pth, opposed to the rightward acting force acting to said valve 61, thereby to generate such throttle pressure in the circuit 102. The key point of this invention is the composition of the plug 62, so the discussion that follows will be centered on the make up and function of this plug. The plug 62 comprises a plug body portion 62a having a cylinder 66, a pilot valve 62b slidably fitted in the cylinder of said plug body portion 62a, a coil spring 67 interposed between said body portion 62a and pilot valve 62b and adapted to act in the direction to separate them from each other, and a pin 68 serving as a stopper to keep the pilot valve 62b from coming off the body portion 62a. The plug 62 is also provided with two oil chambers 65a and 65b, the chamber 65a being connected to the oil chamber 52 in the pressure control valve 50 and the chamber 65b being adapted to serve as a pressure-excluding circuit. Both oil chambers 65a and 65b are communicated with each other through a passage 69 in the body portion, but said passage 69 is closed when the pilot valve 62b is moved to the right against the force of the coil spring 67 and contacts with the body portion 62a. The force of the coil spring 67 interposed between the body portion 62a and the pilot valve 62b is of a far smaller capacity than that of the coil spring 63 disposed between the plug 62 and the valve 61, and it is so adjusted that when the opening of the engine throttle valve reaches one-fourth of the full opening, the pilot valve 62b is moved to the right under pressure of the throttle lever 64 and contacts with the body portion 62a to shut off the passage 69. Therefore, when the opening of the engine throttle valve is less than one-fourth of the full opening, the passage 69 in the body portion 62a remains open to allow discharge of pressure oil in the oil chamber 65a into the oil chamber 65b so that oil pressure remains zero. This oil chamber 65a is connected through the circuit 114 to the oil chamber 52 in the pressure control valve 50 so that when oil pressure in the oil chamber 65a is zero, the pressure in oil chamber 52 in the pressure control valve 50 also stays zero. If the opening of the engine throttle valve is enlarged more than one-fourth of the full opening, the passage 69 in the body portion 62a is closed to inhibit discharge of pressure oil in the oil chamber 65a, so pressure oil supplied from the circuit 100 through orifice 57 and circuit 114 stays in said oil chamber 65a and, therefore it also stays in the oil chamber 52 in the pressure control valve 50.

Now, the hydraulic controlling operation by the above-described pressure control valve and throttle valve 60 will be described in particular. Let it be first assumed that the transmission is in the first or second speed condition. In this condition, no pressure oil is present in the oil chamber 56 in the pressure control valve 50 since no oil exists in the circuit 110 leading to the clutch means 25 for the third speed. In this condition, controlling is effected by the acting force of pressure oil in the oil chamber 52 where the amount of oil is varied according to the opening of the engine throttle valve. In this case, if said opening is less than one-fourth of the full opening, pressure oil in the oil chamber 52 will be zero owing to the action of the plug 62 of the throttle valve 60, so that line pressure PL controlled by the oil chamber 54 will be of a low level balanced with the acting force of spring load of the coil spring 59. This controlled oil pressure level is indicated by a line $a_1$ in the characteristic diagrams of FIGS. 5 and 6. When said opening is enlarged above one-fourth of the full opening, pressure oil in the circuit 100 comes to act to the oil chamber 52, so that line pressure PL to be controlled by the oil chamber 54 is raised to a high level as it is added with the acting force of oil pressure in said chamber 52. This controlled oil pressure level is indicated by a line $a_2$ in the diagrams of FIGS. 5 and 6. As noted particularly from the diagram of FIG. 6, line pressure PL presents a contrasting difference on both sides of the opening value one-fourth.

Figure 5:
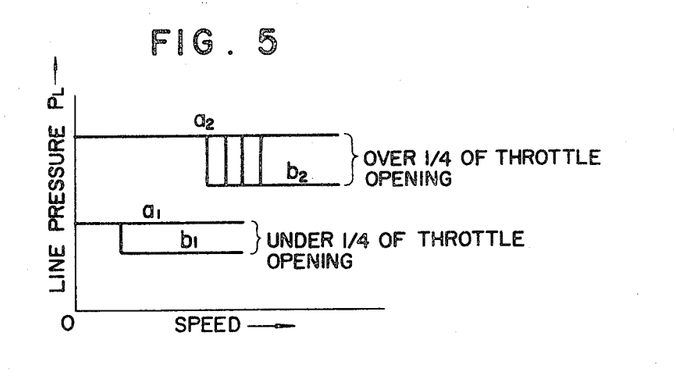
FIG. 5 shows the characteristic lines of line pressure relative to vehicle speed (transmission output shaft) and FIG. 6 shows such characteristic lines relative to the opening of the engine throttle valve.
Figure 6:
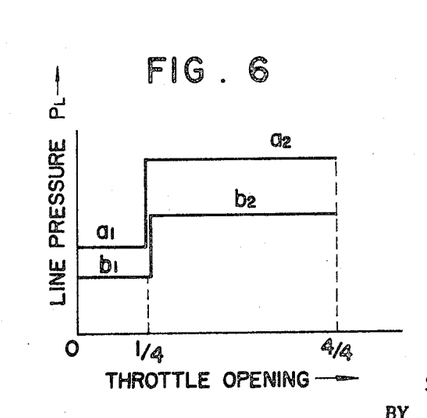

Let it now be assumed that the transmission is in the third speed condition. In this condition, pressure oil is supplied to the circuit 110 leading to the clutch means 25 for the third speed and therefore said oil is also guided to the oil chamber 56 through the circuit 113. Thus in this case, the leftward acting force is provided jointly and severally by the acting forces of the oil chambers 56 and 55 and, hence, the line pressure PL becomes lower than such line pressure produced in the abovementioned first or second speed condition. The levels of such line pressure are indicated in FIGS. 5 and 6 by lines $b_1$ and $b_2$. (line $b_1$ indicating the line pressure level when the opening of the engine throttle valve is less than one-fourth of the full opening and line $b_2$ when said opening is over one-fourth) In this case, too, it will be noted that line pressure is sharply differentiated at the point of one-fourth of the opening. Turn over or shifting of line pressure PL from $a_2$ to $b_2$ or from $a_1$ to $b_1$ is effected at the 2–3 shift points of the transmission as shown in FIG. 5. Since such shifting is achieved by the aforementioned 2–3 shift valve 75, the shifting points are varied according to the quantity of throttle pressure Pth. Namely, when throttle pressure Pth is small, such shifting takes place at a relatively low vehicle speed range, but as throttle pressure is increased, the vehicle speed range at which said shifting takes place is correspondingly raised.

In the foregoing embodiment, oil chamber 52 is arranged such as to produce an acting force in the same direction as the acting force of the spring load of the coil spring 59, but it is also possible to arrange said oil chamber 52 so as to provide an acting force opposed to that of said spring load. In the latter case, however, the operating pattern of pressure oil acting to the oil chamber 52 must be reversed. That is, arrangement of the plug 62 in the throttle valve 60 must be made such that pressure oil is supplied to the oil chamber 52 when the opening of the engine throttle valve is less than one-fourth of the full opening and such oil is discharged from the oil chamber 52 when said opening is enlarged over one-fourth.

As will be understood from the foregoing explanation, it is possible according to the present invention to appreciably lessen the shift shock produced at the time of change over of the manual valve from the N position to the D or R position, or from the P position to the R position, since line pressure PL is extremely low when the opening of the engine throttle valve is smaller than one-fourth of the full opening. It is also possible to minimize the shift shock at the time of changeover to lower speeds (that is, at the time of power-off) and to prevent the creep phenomenon that may otherwise be caused in the D, 2, L or R position.

Further, according to the present invention, there is provided a necessary and sufficient line pressure PL in the first or second speed condition of the transmission where the required engaging torque of the clutch is large, and a lower line pressure is obtained in the third speed condition where said torque is relatively small. Since the time during which the third speed condition is in use in actual running of a vehicle is exceedingly long as compared with other speed ranges, it is possible to minimize horse power loss resulting from pump loss, to get good efficiency and to prevent generation of abnormal sounds.

While a specific embodiment of the invention has been shown and described in detail to illustrate the application of the inventive principles, it will be understood that the invention may be embodied otherwise without departing from such principles.

What we claim is:

1. In a hydraulic control system for an automatic transmission for an engine driven vehicle including an engine, a throttle for said engine, means enabling positioning of said throttle to control said engine, with positioning of said throttle to a first position effecting a lowermost level of engine output and with positioning of said throttle to a second position effecting an uppermost level of engine output, speed change gear means connecting said engine to drive said vehicle, hydraulic servo means for operating said gear change means, a pressure oil source for generating pressure oil supplied to operate said hydraulic servo means, a pressure level control arrangement for controlling the pressure level of oil supplied to said servo means from said oil supply, and conduit means connected to supply pressure oil to said servo means from said oil source through said control arrangement, said control arrangement comprising a pressure control valve controlling the pressure level of pressure oil from said oil source, a first oil chamber in said pressure control valve configured to effect operation of said valve to control the pressure level of oil from said oil source in accordance with the pressure level in said first oil chamber, a throttle valve comprising a movable plug, means for effecting displacement of said plug in accordance with the position of the throttle of said engine, a second oil chamber in said throttle valve, means including said plug for controlling the pressure level in said second chamber in accordance with the position of said engine throttle, and oil passage means connecting said second oil chamber and said first oil chamber to control the pressure in said first oil chamber in accordance with the pressure in said second oil chamber thereby to effect control of the pressure level of oil from said source in accordance with the position of said engine throttle.

2. A hydraulic control system according to claim 1, wherein said gear change means include a high speed gear ratio, there being provided means for supplying or excluding oil pressure to said hydraulic servo means thereby to engage or disengage said high speed gear ratio, said system further comprising a third oil chamber in said pressure control valve, means for applying to said third chamber oil pressure representative of said pressure supplied to said hydraulic servo means for engaging and disengaging said high speed gear ratio, said oil pressure applied to said third chamber operating simultaneously with the pressure in said first oil chamber to effect further control of the level of oil pressure from said oil source in dependence upon engagement or disengagement of said high speed gear ratio.

3. A hydraulic control system according to claim 2, wherein the pressure in said third oil chamber acts upon said pressure control valve in a manner opposed to the pressure in said first oil chamber.

4. A hydraulic control system according to claim 2, wherein said pressure control valve is structurally configured to lower the level of said oil source pressure supply when said high speed gear ratio is engaged and to raise said level when it is disengaged.

5. A hydraulic control system according to claim 2, wherein said pressure control valve comprises a plug movable in response to pressures in said first and third oil chambers and means for venting pressure from said pressure oil source thereby to control said oil source pressure supply level, said movable plug being operable to open and close said venting means in accordance with said pressures in said first and third oil chambers.

6. A hydraulic control system according to claim 1, wherein said throttle valve is structurally configured to effect lowering of the level of said oil source pressure supply when said engine throttle is positioned to effect a level of engine output below a predetermined level, said predetermined level being between said lowermost and said uppermost level, and to effect raising of said supply level when said throttle is above said predetermined level.

7. A hydraulic control system according to claim 6, wherein said predetermined level is selected to be one-quarter of the full range of said engine throttle positions from said first position to said second position.

8. A hydraulic control system according to claim 1, comprising means for venting oil pressure in said second oil chamber, said moveable plug of said throttle valve being operable to open and close said venting means to control the pressure in said second oil chamber and thereby control the pressure in said first oil chamber.

* * * * *